(No Model.)
W. C. RAFFERTY.
DEVICE FOR DETERMINING LOCATION OF DISTANT OBJECTS.
No. 578,117. Patented Mar. 2, 1897.
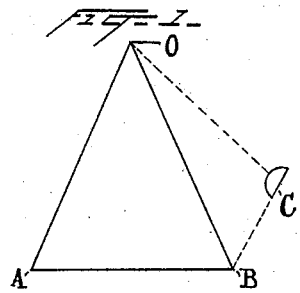
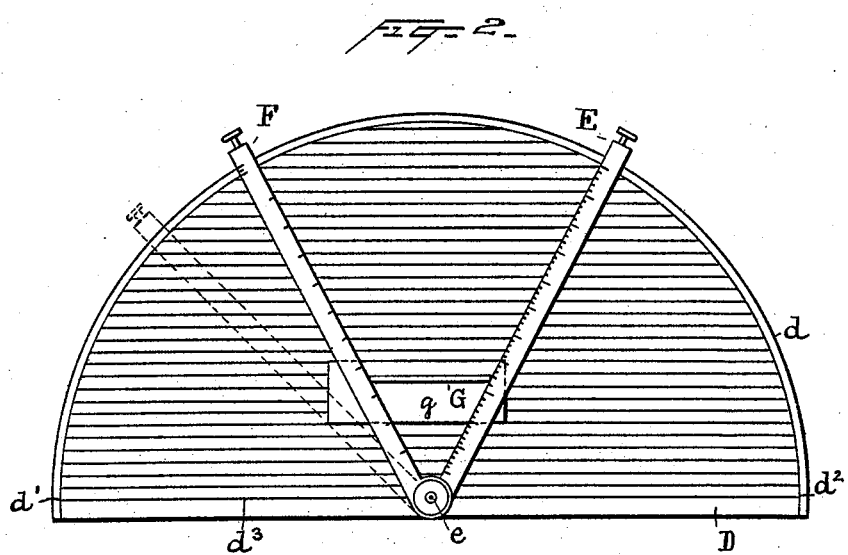
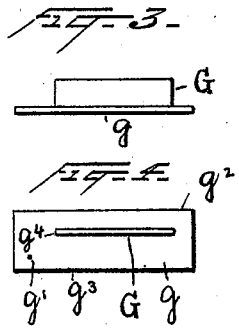
Witnesses
Norris H. Clark.
John R. Taylor.
Inventor
William C. Rafferty
By his Attorneys
Dyer & Driscoll
THE NORRIS PETERS CO., PHOTO-LITHO., WASHINGTON, D. C.

UNITED STATES PATENT OFFICE.

WILLIAM C. RAFFERTY, OF GOVERNOR'S ISLAND, NEW YORK.

DEVICE FOR DETERMINING LOCATIONS OF DISTANT OBJECTS.

SPECIFICATION forming part of Letters Patent No. 578,117, dated March 2, 1897.

Application filed February 21, 1896. Serial No. 580,179. (No model.)

*To all whom it may concern:*

Be it known that I, WILLIAM C. RAFFERTY, a citizen of the United States, residing at Governor's Island, in the county and State of New York, have invented a certain new and useful Improvement in Devices for Determining the Locations of Distant Objects, of which the following is a specification.

The present invention is an improvement upon the device described and claimed in Patent No. 552,261, granted to me December 31, 1895. It comprises means for mechanically determining at one point the polar coördinates of a distant point with respect to that point and the meridian-line or other line when the azimuth of such distant point from two other points, the azimuth and length of the line joining these two points, and the polar coördinates of the first point from these two points are known. Thus, to restate this proposition more clearly, let the apex O of a triangle represent the distant object, the base of the triangle being A B and said triangle being therefore bounded by the sides A B, O A, O B. The angle O A B and the angle O B A may be readily calculated by any of the well-known forms of angle-determining devices, for instance, transits. If now it be desired to ascertain from a fourth point, the polar coördinates of which relatively to points A and B are known, the polar coördinates of O relatively to such fourth point, the mechanism hereinafter described is employed and the angles calculated by the transits at A and B utilized as a basis for its operation.

The main features of the location-determining device having been fully and in detail described in my previous patent above referred to, such description will not be repeated here except in so far as it may be necessary for the purpose of clearly describing the present improvement.

In the drawings, Figure 1 is a diagrammatic view hereinafter to be referred to. Fig. 2 is a plan view of the base or board and its coacting mechanism through the medium of which the polar coördinates of a distant object are ascertained. Figs. 3 and 4 are enlarged detail views, in side elevation and plan, respectively, illustrating the spacing-piece adapted in operation to be placed between the pivotally-mounted arms upon the base in accordance with the invention.

Referring by letter to the drawings, which illustrate an approved embodiment of the invention, D designates a base approximately semicircular in form and provided with a peripheral scale or graduation $d$. This scale or graduation is provided with numbers commencing at any point and running to three hundred and sixty degrees, certain of the numbers being preferably upon the inside of the scale or graduation and others upon the outside. Thus should such numbers, counting in tens, be commenced at the point $d'$ and upon the outside of the scale they would run to the point $d^2$, numbered "180," while the remaining one hundred and eighty degrees of the circle (or from "180" to "360") would run on the inside of the scale from the point $d'$ to the corresponding point next to the point $d^2$. I have found it desirable to combine with this circular scale a diagonal vernier, (not shown,) permitting the divisions of a degree to be ascertained.

The base D is finely divided into parallel lines, marks, grooves, or other indicia, hereinafter referred to as "lines." These commence in the present instance at a point adjacent to the straight side of the base, the first line passing through a pivot $e$ and extending outwardly to the periphery of the base. All the lines upon the base are parallel. On the pivot $e$ are mounted movable arms E F, and each of these arms is provided with a suitable scale or graduation for the purpose hereinafter described. The arms E F may, if desired, be so mounted as that in operation they shall have movement over the entire surface of the base D and a short distance above the surface of said base.

G, Figs. 3 and 4, designates a spacing-piece adapted to be placed upon the surface of the base D between the arms E F. This spacing-piece may be mounted upon a support $g$ of such thickness as that when the spacing-piece and its support are laid upon the surface of the base D the arms E F may freely move over the latter and into contact with the ends of the former. The support $g$ is provided with a mark, recess, pin, or other indication $g'$, the purpose of which will be hereinafter described.

Turning now to the diagram Fig. 1, I will describe a simple application of the invention. In this diagram, O is the distant point, the location of which relative to the point C is to be determined. At the points A and B are located angle-determining devices of any desired type, hereinafter referred to as "transits." By means of the transit located at the point A the angle at A between the object O and the point B is determined. By means of a similar device located at the point B the angle O B A may be determined. The points A B being fixed, their relation to each other will be known. At C is located the device heretofore described, and this being also a fixed point its location relatively to A and B is known. The angle ascertained at A is transmitted to the point C by suitable means, and the arm F upon the location-determining device is moved upon the surface of the base D, so as to indicate, at the point of interception of the scale upon said arm with the circular scale and diagonal vernier $d$ upon the base, a reading representing said angle found at A. The angle found at B is also transmitted to C and the arm E upon the base D actuated so as to indicate a reading upon the scale and vernier representing said angle. The spacing-piece G is then placed upon the board between the arms E F and the support $g$ passed toward the pivot $e$, its long sides $g^2 g^3$, or one of them, being parallel to one of the straight parallel divisions $d^3$. When the spacing-piece has reached a point where its edges contact with the edges of the arms E F, the reading at that point of the scales or graduations upon the arms E F will indicate the polar coördinates of O relatively to the point A or B. Now the location of C relatively to A and B being known it only remains to mechanically ascertain upon the device the distance and direction of O C based upon the known relation of C to A and B, and for this purpose I employ the mark or other indication $g'$. This mark is fixed at a point indicating, according to the scale employed, the distance from the point C to the points B and A. If, therefore, after the operation described of the arms and spacing-piece of the location-determining device the arm F be turned toward the left (in the present instance) to the position shown in dotted lines on Fig. 2, the scale or graduation upon said arm F at the point adjacent to the mark or other indication $g'$ will represent the distance of O from C, and the reading upon the scale or graduation $d$ at the point of interception with the vernier upon the arm F will indicate the direction of O from C.

Thus it will be understood that the mechanical solution of the proposition of locating O relatively to C is controlled by the relation, construction, and adjustment of the various elements described. The line A B, Fig. 1, is represented in direction by the long side $g^3$ of the support $g$ of the spacing-piece and in length in the present instance by the length of said piece G. The line C B is represented in direction and distance by the relation of the mark or indication $g'$ to the end $g^4$ of the spacing-piece, and the direction of the line A B upon the diagram is represented by the relation of the spacing-piece G to the long side $g^3$ of said piece. It is obvious that the spacing-piece G may be arranged in any desired relation to the long side $g^3$ of the support, such relation varying with variations of location of the transits with relation to the line A B.

Having now described my invention, what I claim, and desire to secure by Letters Patent, is—

1. In a device for determining the location of a distant object, the combination with a base having parallel straight divisions, a scale or graduation and movable arms mounted upon a common pivot, of a spacing-piece adapted to be placed upon said base and between said arms and indicating by a recording-scale upon one of said arms the location of a distant object relatively to a point occupying a fixed relation to a known base-line, substantially as set forth.

2. In a device for determining the location of a distant object, the combination with a base having parallel straight divisions, a scale or graduation and movable arms mounted upon a common pivot, of a spacing-piece adapted to be placed upon said base and between said arms, and means for determining, according to the scale employed, the position of the point of location of the device relatively to a distant object when the relativity of such point to a common base-line is known, substantially as set forth.

3. In a device for determining the location of a distant object, the combination with a base having parallel divisions, a scale or graduation and pivotally-mounted arms, of a spacing-piece comprising a support, and means carried thereby for limiting the movement of said support between said arms and toward their pivotal point, substantially as set forth.

4. In a device for determining the location of a distant object, the combination with a base having parallel divisions, a scale or graduation and pivotally-mounted arms, of a spacing-piece comprising a base or support, a piece thereon adapted to be placed between said arms, and a mark or other indication upon said support, substantially as set forth.

This specification signed and witnessed this 31st day of January, 1896.

WILLIAM C. RAFFERTY.

Witnesses:
J. O. EDMONDS,
JOHN R. TAYLOR.